Patented Feb. 9, 1954

2,668,826

UNITED STATES PATENT OFFICE 2,668,826

S-(ETHYLXANTHOYL) O,O-DI(2,4,5-TRI-CHLOROPHENYL) DITHIOPHOSPHATE

Henry Tolkmith, Midland, Mich., assignor to The Dow Chemical Company, Midland, Mich., a corporation of Delaware No Drawing. Application April 21, 1953, Serial No. 350,239

1 Claim. (Cl. 260—455)

This invention is directed to S-(ethylxanthoyl) O,O-di(2,4,5-trichlorophenyl) dithiophosphate of the formula

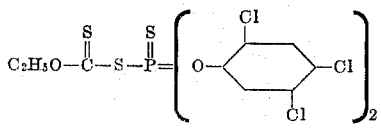

This compound is a viscous oil, somewhat soluble in many organic solvents and substantially insoluble in water. It is of value as an intermediate for the preparation of more complex phosphorus derivatives and as toxic constituent of parasiticide compositions.

The new compound may be prepared by reacting two molecular proportions of 2,4,5-trichlorophenol with one molecular proportion of S-(ethylxanthoyl) dithiophosphoric dichloride of the formula

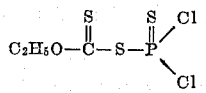

in an inert organic solvent such as benzene or diethyl ether. The reaction is carried out in the presence of a hydrogen chloride acceptor such as pyridine.

In carrying out the reaction, a mixture of the 2,4,5-trichlorophenol, pyridine and solvent is added with stirring to the S-(ethylxanthoyl) dithiophosphoric dichloride and the resulting dispersion heated for a period of time at a temperature of from 35° to 80° C. In practice, it is sometimes convenient to operate at the boiling temperature of the reaction mixture and under reflux. Temperatures substantially in excess of 80° C. for any appreciable period of time should be avoided, as the desired product has a tendency to decompose at such temperature. Upon completion of the reaction, the mixture may be filtered and the filtrate distilled under reduced pressure at temperatures gradually increasing to a temperature of 80° C. to separate low boiling constituents and to obtain as a residue the desired S-(ethylxanthoyl) O,O-di(2,4,5-trichlorophenyl) dithiophosphate.

The S-(ethylxanthoyl) dithiophosphoric dichloride employed as a starting material in the above-described methods may be prepared by reacting one molecular proportion of sodium ethylxanthate with at least two molecular proportions of phosphorus thiochloride in an inert organic solvent such as benzene. In carrying out the reaction, the reactants are dispersed in the solvent and the resulting mixture heated for a period of time at a temperature of from 40° to 80° C. To avoid decomposition, temperatures substantially in excess of 80° C. for any appreciable period of time should not be employed. Upon completion of the reaction, the mixture may be filtered and the filtrate concentrated by distillation under reduced pressure to a temperature up to 80° C. to obtain as a residue the desired S-(ethylxanthoyl) dithiophosphoric dichloride. This compound is a viscous oil having a density of 1.451 at 21° C. The latter compound and described method for its preparation are disclosed in my copending application Serial No. 203,768, filed December 30, 1950.

In a representative preparation, a mixture of 33 grams (0.184 mole) of 2,4,5-trichlorophenol, 14.5 grams (0.183 mole) of pyridine and 400 milliliters of diethyl ether was added with stirring to 25 grams (0.098 mole) of S-(ethylxanthoyl) dithiophosphoric dichloride dispersed in 100 milliliters of diethyl ether and the resulting mixture heated for 6 hours at the boiling temperature and under reflux. At the end of this period, the mixture was filtered and the filtrate distilled under reduced pressure to a temperature up to 80° C. to obtain as a residue an S-(ethylxanthoyl) O,O-di(2,4,5-trichlorophenyl) dithiophosphate product. The latter is an oily liquid having a density of 1.4324 at 20° C.

The new S-(ethylxanthoyl) O,O-di(2,4,5-trichlorophenyl) dithiophosphate product is effective as a parasiticide and adapted to be employed for the control of a wide range of agricultural and household pests such as flies, mites, aphids, beetles, cockroaches and Southern army worms. For such use, the compound may be dispersed on an inert finely divided solid and employed as a dust. Also, such mixtures may be dispersed in water with the aid of a dispersing and wetting agent and the resulting aqueous suspensions employed as sprays. In other procedures, the new product may be employed in oils, as a constituent in oil-in-water emulsions, or in water dispersion with or without the addition of emulsifying, wetting or dispersing agents. Suitable concentrations of the toxicant in dusts are in the order of from about 0.1 to 10 percent by weight of the dust and in liquid suspensions from about 0.1 to 3 pounds per 100 gallons of the spray mixture. In representative operations against bean aphids, Mexican bean beetles and Southern army worms, 100 percent kills of these pests were obtained with aqueous spray compositions containing 0.25 pound of the toxic phosphate per 100 gallons of spray mixture.

This is a continuation in part of my copending application Serial No. 203,769, filed December 30, 1950.

I claim:

S-(ethylxanthoyl) O,O-di(2,4,5-trichlorophenyl) dithiophosphate.

HENRY TOLKMITH.

No references cited.